United States Patent
Mathews et al.

(10) Patent No.: US 6,418,521 B1
(45) Date of Patent: Jul. 9, 2002

(54) HIERARCHICAL FULLY-ASSOCIATIVE-TRANSLATION LOOKASIDE BUFFER STRUCTURE

(75) Inventors: Gregory S. Mathews, Santa Clara; Dean A. Mulla, San Jose; John Wai Cheong Fu, Saratoga; Stuart E. Sailer, Campbell, all of CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/221,230

(22) Filed: Dec. 23, 1998

(51) Int. Cl.[7] .............................................. G06F 12/08
(52) U.S. Cl. ...................... 711/207; 711/122; 711/205; 711/206
(58) Field of Search ................................ 711/207, 204, 711/205, 206, 122, 123, 136

(56) References Cited

U.S. PATENT DOCUMENTS 5,412,787 A * 5/1995 Forsyth et al. .............. 711/207
5,940,872 A * 8/1999 Hammond et al. .......... 711/207
5,991,848 A * 11/1999 Koh ................................ 711/3

* cited by examiner

Primary Examiner—Do Hyun Yoo
Assistant Examiner—Jasmine Song
(74) Attorney, Agent, or Firm—Schwegman, Lundberg, Woessner & Kluth, P.A.

(57) ABSTRACT

A fully-associative translation lookaside buffer structure for a computer system includes a first-level TLB0 memory having a plurality of entries and a second-level TLB1 memory operatively coupled to the first level TLB0 memory. The second-level TLB1 memory also has a plurality of entries. Entries are placed in the TLB0 and TLB1 structure as a result of software controlled translation register operations and hardware controlled translation cache operations. Logic controlling TLB0 treats both operations the same way and uses a hardware replacement algorithm to determine the entry index. Logic controlling TLB1 uses a hardware replacement algorithm to determine the entry index for translation cache entries, and use an index provided within the insertion instruction to determine the entry index for translation register operations.

22 Claims, 2 Drawing Sheets

HIERARCHICAL FULLY-ASSOCIATIVE-TRANSLATION LOOKASIDE BUFFER STRUCTURE

FIELD OF THE INVENTION

The present invention relates generally to the field of electronic data processing systems, and more particularly to virtual memory systems.

BACKGROUND OF THE INVENTION

Many computer systems today use virtual memory systems to manage and allocate computer memory to various processes running within the computer system. Virtual memory systems, as known in the art, allow each process running on the system to operate as if it has control of the full range of addresses provided by the machine, without having to be concerned whether or not there is physical memory at the particular address or not. The operating system then takes care of mapping the virtual address space for each process to the actual physical address space for the system. The mapping from a physical address to a virtual address is typically maintained through the use of page tables.

Over time, computer processors have become faster, and systems have been developed in which multiple processors are used to execute the various computer programs running on a computer system. This has resulted in increased demands for memory performance, including performance of virtual memory systems. One important aspect of virtual memory system performance is insuring that "forward progress" can be made. Forward progress means that the CPU (Central Processing Unit) has access to the memory or other resources it needs to execute the current instruction without waiting.

One way in which the performance of virtual memory systems is improved is through the use of a translation lookaside buffer (TLB). A TLB is a relatively small section of memory on a processor which caches part of the system's virtual address to physical address translations. The translation can often be very large and complex and the data structures that comprise the translation set (often a page-table, where the memory described by a single translation is referred to as a page, or a memory page) can be too large to store efficiently on the processor. Instead, a few elements of the translation set are stored in the TLB which the processor can access extremely quickly. If a required translation for a particular virtual address is not present in the TLB, a "translation miss" occurs and the address translation is resolved using more general mechanisms implemented within hardware or the operating system running on the computer.

A typical computer system will use one of two mechanisms to maintain entries in a TLB. In the first mechanism, software instructions are executed which designate a particular entry in the TLB to modify. This mechanism allows the operating system software running on the computer to maintain the TLB.

In the second mechanism, hardware, such as the memory management unit of a computer system, controls the placement of entries in the TLB using a hardware replacement algorithm. This mechanism allows the TLB to serve as a cache of recently used address translations.

In addition, two types of TLBs have been used in previous computer systems. The first is referred to as a set-associative TLB. A set-associative TLB contains multiple entries used to contain cached virtual to physical address mappings. Each entry in the TLB is used to map a particular set of addresses. In other words, the mapping for a particular address will always be contained, if at all, in a specific set of TLB entries. While set-associative TLBs are generally faster than other types of TLBs, they have the disadvantage that it is difficult to support multiple memory page sizes without maintaining multiple structures.

A second type of TLB is the fully-associative TLB. Previous systems have implemented what will be referred to as a non-hierarchical TLB, that is, a singlelevel TLB structure. In a fully-associative TLB, any entry in the TLB can be used to map any address, there is no predetermined entry used to hold a translation for a particular address. A fully-associative TLB has the advantage that it is relatively easy to support multiple memory page sizes. However, a disadvantage to the non-hierarchical fully-associative TLB is that it cannot guarantee forward progress in those architectures that provide for software control of entries in the TLB. This is because a software instruction could cause the most recently used entry to be replaced, and therefore no longer available to provide a virtual to physical mapping for an address that may be required in the next instruction cycle.

For the reasons stated above, and for other reasons stated below which will become apparent to those skilled in the art upon reading and understanding the present specification, there is a need in the art for the present invention.

SUMMARY OF THE INVENTION

In one embodiment of the invention, a fully-associative translation lookaside buffer structure for a computer system providing translation register support and translation cache support includes a first-level TLB0 memory having a plurality of entries. The TLB0 entries are modified by the translation register operations and the translation cache operations. The TLB0 treats translation register operations as if they are translation cache operations.

Also included is a second-level TLB1 memory operatively coupled to the first level TLB0 memory. The second-level TLB1 memory also has a plurality of entries that are modified by translation register operations and translation cache operations.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
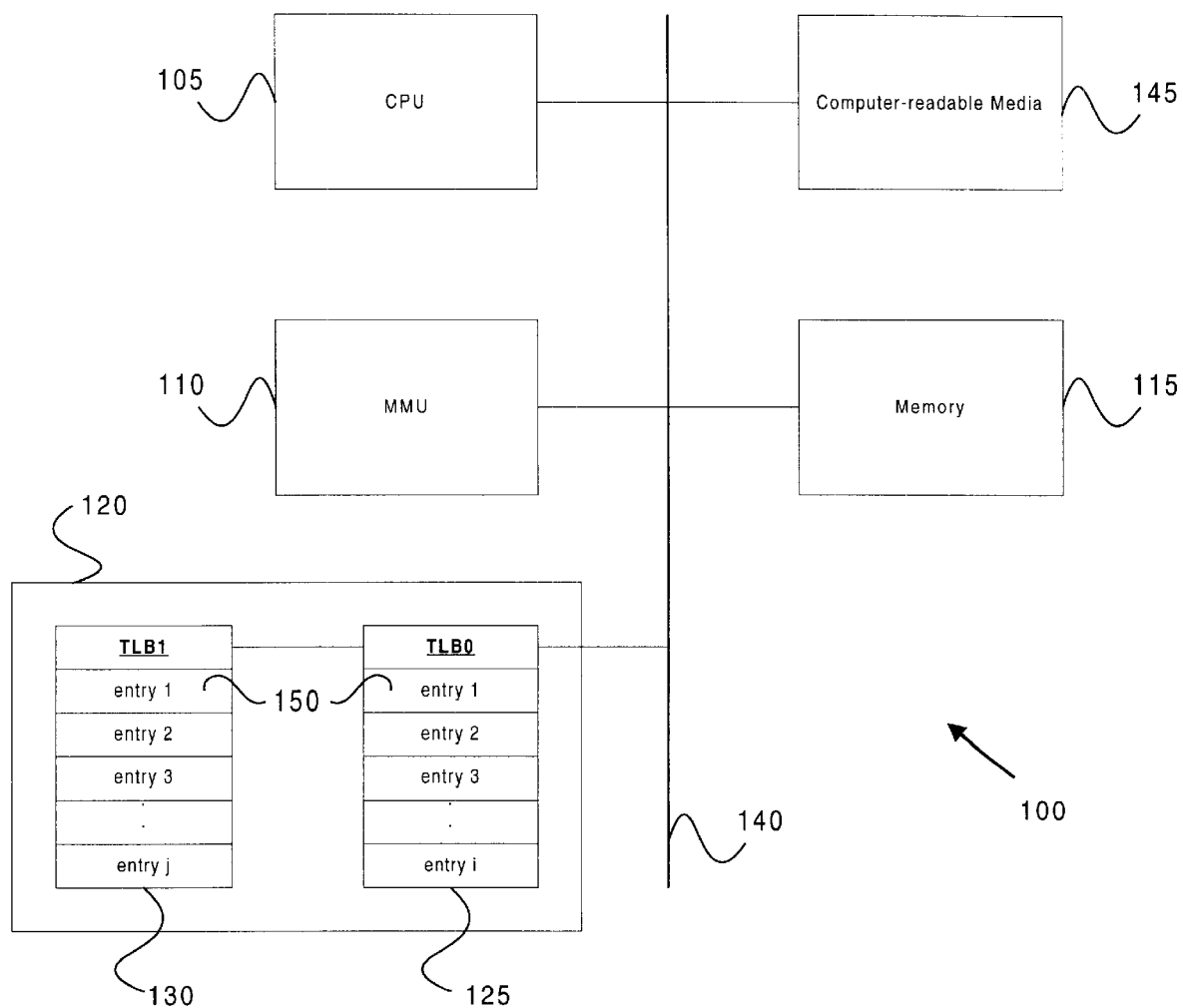
FIG. 1 is a block diagram illustrating a computer system incorporating a fully-associative hierarchical TLB structure according to an embodiment of the invention.

FIG. 1 is a block diagram illustrating an exemplary computer system 100 incorporating a fully-associative hierarchical TLB structure according to an embodiment of the invention. In one embodiment of the invention, computer system 100 comprises CPU 105, memory management unit (MMU) 110, memory 115, and TLB 120, all coupled via bus 140. In addition, computer system 100 includes computer-readable media 145, operatively coupled to CPU 105 via bus 140. The bus 140 can include a single bus or a combination of multiples buses. Those skilled in the art will recognize that a computer system may include other components, including additional CPUs, and that only those components necessary to provide an enabling description of the invention are described here.

CPU 105 is capable of decoding and executing a computer program such as an application program or operating system. In one embodiment, the CPU is capable of decoding and executing a computer program such as an application program or operating system with instructions from multiple instruction sets.

MMU 110 comprises logic circuitry and software that manage memory 115 of the system. In one embodiment of the invention, MMU 110 is what is known as an on-chip MMU and is located on the same chip as CPU 105. However the invention is not so limited and MMU may be located on a separated entity from CPU 105.

Memory 115 is conventional computer memory, including dynamic random access memory (DRAM), static random access memory (SRAM), flash type memory, or other alternative memory types. In addition, memory 115 may include cache memory.

Computer programs and other computer executable modules are loaded into memory 115 from any of a number of different computer-readable media. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary computer system.

When CPU 105 executes an instruction requiring the contents of a memory location to be loaded, TLB 120 is searched to determined if the TLB 120 can provide the required translation from a virtual address to a physical address. TLB 120 is a fully-associative hierarchical TLB, having at least two components, a first-level TLB0 125 and a second-level TLB1 130. TLB0 125 is a memory array capable of holding a plurality of TLB entries 150. In one embodiment of the invention, TLB0 125 contains 32 entries, however the invention is not so limited. The choice for a particular TLB0 size will be determined by memory speed, cost and size considerations. In addition, it is desirable that dual-ported memory is used for TLB0 and that the memory logic for TLB0 allows at least two accesses per clock cycle.

In one embodiment of the invention, TLB0 contains logic to guarantee that the eight entries most recently inserted or used are not replaced (although they can be purged). In this embodiment, the eight entries are preserved in order to insure that forward progress can be maintained for instructions implemented in microcode that may require storing or loading up to eight different memory locations. Those skilled in the art will appreciate that the most appropriate choice of a particular number of entries to reserve for an instruction cycle will depend on the particular instruction set or microcode used to implement particular instructions within the instruction set.

TLB1 130 is a memory array that also contains a plurality of TLB entries 150. TLB1 130 is operatively coupled to TLB0, and is used to supply translations to TLB0 125 in the event that a desired translation is not in TLB0. In one embodiment of the invention, TLB1 comprises single ported memory and contains 96 entries. However the invention is not so limited, and other table sizes could be used. It is desirable that TLB1 contain a large number of entries in order to reduce the chance of a translation miss.

Each TLB entry 150 specifies a mapping for a page of memory. The information maintained in a TLB entry 150 includes the physical address for the page, the page size, permissions and memory type. In one embodiment of the invention, ten different page sizes are possible, however, the invention is not so limited. Permissions include whether the page is readable, writeable or executable by a program or set of programs. Memory type includes whether the memory is non-cacheable, write through, or write-back cacheable. Those of ordinary skill in the art will recognize that variations in the data components included in a TLB entry 150 are possible and within the scope of the invention.

In one embodiment of the invention, two types of TLB entries 150 exist, a translation register entry (TR) and a translation cache entry (TC). A TR is the result of translation register operation and a TC is the result of translation cache operation. TRs are entries that can only be inserted or purged using a privileged instruction. Before any TR or TC entry can be inserted, the TLB will first perform a purge of that address/size to guarantee that overlapping entries will not be present in the TLB at the same time. In other words, TLB logic ensures that a particular virtual address is not contained in more than one page mapped by the set of TLB entries in TLB0 or TLB1 (but the same exact translation may appear in both TLB0 and TLB1).

For translation register operations, the insertion index identifying the entry to be replaced is included as part of the TR insertion instruction. Logic controlling the TLB insertion index allows TRs to replace other TRs, and also allows TRs to replace TCs. However, the logic will raise a fault should a TR insert be attempted with an address/size which overlaps an existing valid TR entry. It is desirable to provide TRs, because it allows the operating system to "lock" certain important address translations into the TLB. These translations typically include translations for memory containing exception handling code and other critical components of the operating system which need to be available at all times.

TCs are TLB entries that can be inserted, purged, or replaced via a software instruction or on an as-needed basis by hardware. The insertion index for a particular TC is determined by a hardware replacement algorithm. In one embodiment of the invention, logic controlling the TLB allows TCs to replace other TCs. However, the replacement algorithm logic insures that a TC insertion index will not be generated which would cause the replacement of a TR, and similar to a TR insertion, the insertion logic will raise a fault should a TC insert be attempted with an address/size which overlaps an existing valid TR entry.

TLB0 and TLB1 each treat TCs the same way, that is, a hardware replacement algorithm is used to determine where in TLB0 or TLB1 the TC is to be placed. However, they differ in their treatment of TRs. The difference is that logic controlling TLB0 treats a TR in the same way it treats a TC, that is, the insertion index into TLB0 is determined by a hardware replacement algorithm and not the index that is provided in the TR insertion instruction. The TLB0 replacement algorithm logic allows insertion indexes to be generated which will cause TCs to replace TRs and TLB0 will not raise a fault should an attempt be made to insert a TC entry which overlaps an existing valid TR entry (but a fault will still be raised in this case, because of the insertion into TLB1). This is unlike TLB1, which uses the insertion index specified in the insert instruction and which will raise a fault if an attempt is made to insert a TR or TC entry which overlaps an existing valid TR entry.

In an embodiment of the invention, the number of TR entries that can be inserted into TLB1 is limited so that the maximum number of TR entries is half the total number of entries in TLB1 and they can be evenly distributed across the TLB. This limitation provides a reasonable balance between allowing software insertion of TRs, and providing an adequate number of TC entries for caching purposes and helps insure fairness in the TC replacement algorithm. Since the replacement algorithm logic must insure that TCs do not replace TRs, if TRs were unevenly distributed or if too many were allowed to exist in TLB1 at one time, then performance could be lost by the biasing of the replacement algorithm, forward progress could be lost by limiting the number of entries available for TC insertion, or if the TLB was completely consumed by TRs, no entries would be available for TCs whatsoever, which could possibly cause a deadlock situation. All embodiments of the invention are not necessarily so limited to the above described mechanism, however.

In a further embodiment of the invention, when a TR or TC insert is performed, the purge which precedes the insertion is always performed to both TLB0 and TLB1, even if the insert is performed only to one level of the TLB hierarchy for replacement algorithm performance optimization. In this way the entries in TLB0 and TLB1 are guaranteed to not overlap unless they are the exact same translation. Thus when it is needed to retrieve a translation missing for TLB0 which is present in TLB1, no purge of overlapping entries in TLB0 need be performed before the insertion takes place.

Figure 2:
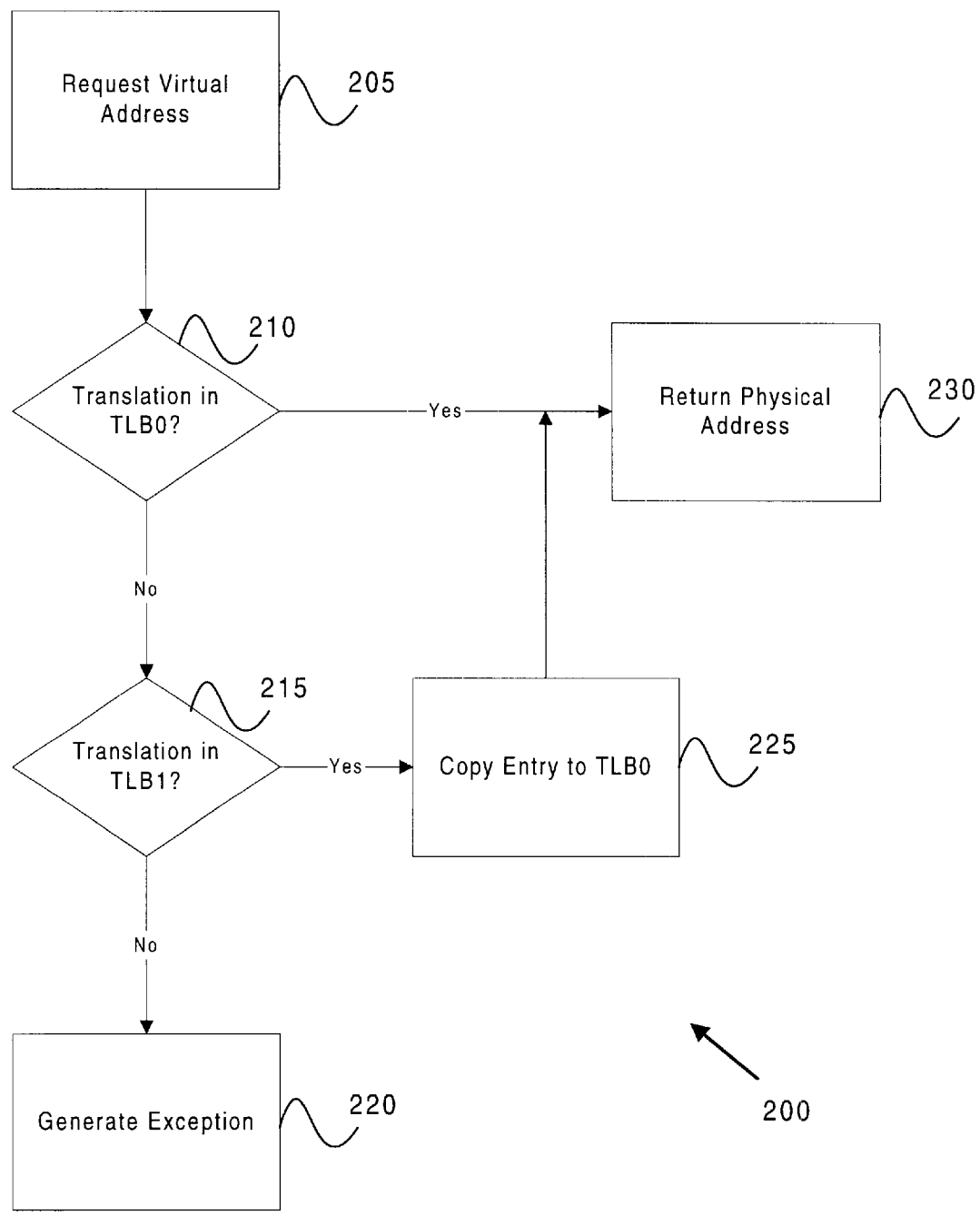
FIG. 2 is a flowchart illustrating a method of accessing an address mapping using a fully-associative hierarchical TLB structure according to an embodiment of the invention.

FIG. 2 is a flowchart illustrating a computerized method of accessing an address mapping using a fully-associative hierarchical TLB structure according to an embodiment of the invention. The computerized method can be realized at least in part as one or more programs running on a computer—that is, as a program executed from a computer-readable medium such as a memory by a processor of a computer. In addition, the method can be implemented within firmware or hardware that is part of a computer system.

The method begins at block 205, where a CPU requires a translation of a virtual address to a physical address. The translation could be required due to a load or a store of a particular memory location by an application or the operating system.

Next, at block 210, a check is made to see if the desired translation exists in one of the entries in the first level TLB, TLB0. If the translation exists, the method then proceeds to block 230, which returns the physical address to the CPU.

In one embodiment of the invention, block 230 also uses access rights data in the TLB entry and compares it to access rights associated with the program that requires a virtual to physical address translation to ensure that the program should be allowed a desired access (read, write or execute, etc.) to the designated memory location. An exception, or fault, is generated if the program does not have the necessary access rights.

If the check at block 210 fails to find the desired translation, the method proceeds to block 215, where a check is made to see if the desired translation exists in the second level TLB, TLB1. If the translation exists, block 225 places the desired translation into TLB0, and then proceeds to block 230, which returns the physical address to the CPU.

If the check at block 215 also fails to find the desired translation, an exception, or fault, is generated at block 220 in one embodiment of the invention. This typically causes the operating system to search for the desired translation in the page tables maintained by the operating system. In an alternative embodiment of the invention, if the check at block 215 also fails to find the desired translation, a subroutine implemented in hardware or firmware queries page tables in memory to find the desired translation. In other words, hardware or firmware "walks" the page table to find the desired translation.

From the foregoing detailed description, those skilled in the art will appreciate that the embodiments of the invention provide advantages not found in previous systems. The hierarchical fully-associative TLB structure provides support of both TR and TC type entries while still guaranteeing forward progress. Forward progress can be guaranteed because TLB0 caches the most recently used address translations. In addition, even though TR entries cannot be guaranteed to be in TLB0 due to possible replacement by TCs, they are guaranteed to be in TLB1.

In addition, embodiments of the invention provide TR operations and still guarantee forward progress. In previous systems, the use of TRs was incompatible with forward progress because, as discussed above, the TR specifies an insertion index that could cause a TC to be overwritten, thereby causing forward progress to fail. However, in embodiments of the invention, the TLB0 treats a TR as a TC, and the location in TLB0 is chosen by the replacement algorithm (ignoring the specified insertion index) thereby preserving the most recently used cache entries to guarantee forward progress. However, the TR will be placed in TLB1 using the specified index, thus guaranteeing that the TR will be maintained at least the TLB1 entry specified by the software instruction. Thus, embodiments of the invention avoid the expense and performance impact of implementing a hardware replacement algorithm that recognizes that a TC needed to guarantee forward progress is about to be replaced by a TR, and copying the needed TC to a different TLB location in order guarantee forward progress.

Other advantages provided by the present invention include the ability to define access rights and support for multiple page sizes.

Although specific embodiments have been illustrated and described herein, it will be appreciated by those of ordinary skill in the art that any arrangement which is calculated to achieve the same purpose may be substituted for the specific embodiments shown. For example, the structures and methods described herein can be applied to both data address translation and instruction address translation, or both simultaneously. In addition, the structures and methods apply to any system allowing software and hardware control of a translation lookaside buffer. This application is intended to cover any adaptations or variations of the present invention. Therefore, it is manifestly intended that this invention be limited only by the following claims and equivalents thereof.

What is claimed is:

1. A fully-associative translation lookaside buffer structure for a computer system providing translation register insertion operations and translation cache insertion operations, the structure comprising:
   a first-level TLB0 memory having a plurality of entries modified by the translation register insertion operations and the translation cache insertion operations, and wherein the translation register insertion operations are treated substantially the same as the translation cache insertion operations; and
   a second-level TLB1 memory operatively coupled to the first level TLB0 memory, said second-level TLB1 memory having a plurality of entries modified by the translation register insertion operations and the translation cache insertion operations.

2. The structure of claim 1, wherein the first-level TLB0 memory comprises a dual-ported memory.

3. The structure of claim 1, wherein a subset of the plurality of entries in the first-level TLB0 memory are not replaced by the translation register insertion operations or the translation cache insertion operations during an insertion into the translation lookaside buffer.

4. The structure of claim 3, wherein the subset comprises eight entries.

5. The structure of claim 1, wherein the maximum number of entries in the second level TLB1 memory resulting from the translation register insertion operations is at least one less than the total number of entries in the TLB1 memory.

6. The structure of claim 1, wherein the maximum number of entries in the second level TLB1 memory resulting from the translation register insertion operations is half the total number of entries in the TLB1 structure.

7. The structure of claim 1, wherein the first-level TLB0 memory has at least 32 entries.

8. The structure of claim 1, wherein the second-level TLB1 memory has at least 96 entries.

9. A method for translating a virtual address to a physical address, the method comprising:
   modifying a first-level translation lookaside buffer having a plurality of first-level entries, the modification comprising translation register insertion operations or translation cache insertion operations, wherein the translation register insertion operations are treated substantially the same as the translation cache insertion operations;
   receiving a request for a virtual to physical address translation for a computer program;
   searching the first-level translation lookaside buffer; and
   if a first-level matching entry is found in the plurality of first-level entries, returning a physical address associated with the first-level matching entry, and if a first-level matching entry is not found:
      searching a second-level translation lookaside buffer having a plurality of second-level entries;
      if a second-level matching entry is found in the plurality of second-level entries, returning a physical address associated with the second-level matching entry.

10. The method of claim 9, further comprising generating a fault if the virtual to physical address translation does not exist in either of the first-level translation lookaside buffer and the second-level translation lookaside buffer.

11. The method of claim 9, further comprising entering a hardware implemented subroutine that scans a page table for the virtual to physical address translation.

12. The method of claim 9, wherein said act of returning a physical address associated with the first-level matching entry includes comparing a set of access rights data in the entry with a desired access right associated with the computer program and generating an exception if the desired access right does not appear in the set of access rights data.

13. The method of claim 9, wherein said act of returning a physical address associated with the second-level matching entry includes comparing a set of access rights data in the entry with a desired access right associated with the computer program and generating an exception if the desired access right does not appear in the set of access rights data.

14. The method of claim 9, wherein said act of returning a physical address associated with the second-level matching entry includes copying the second-level matching entry into the first-level translation lookaside buffer.

15. The method of claim 14, wherein a purge of the first-level translation lookaside buffer is not performed before copying the second-level matching entry into the first-level translation lookaside buffer.

16. A computer-readable medium containing computer-executable instructions for performing a method comprising:
   modifying a first-level translation lookaside buffer having a plurality of first-level entries, the modification comprising translation insertion register operations or translation cache insertion operations, wherein the translation register insertion operations are treated substantially the same as the translation cache insertion operations;
   receiving a request for a virtual to physical address translation for a computer program;
   searching the first-level translation lookaside buffer; and
   if a first-level matching entry is found in the plurality of first-level entries, returning a physical address associated with the first-level matching entry, and if a first-level matching entry is not found:
      searching a second-level translation lookaside buffer having a plurality of second-level entries;
      if a second-level matching entry is found in the plurality of second-level entries, returning a physical address associated with the second-level matching entry.

17. The computer-readable medium of claim 16, wherein the method further comprises generating a fault if the virtual to physical address translation does not exist in either of the first-level translation lookaside buffer and the second-level translation lookaside buffer.

18. The computer-readable medium of claim 16, further comprising entering a hardware implemented subroutine that scans a page table for the virtual to physical address translation.

19. The computer-readable medium of claim 16, wherein said act of returning a physical address associated with the first-level matching entry includes comparing a set of access rights data in the entry with a desired access right associated with the computer program and generating an exception if the desired access right does not appear in the set of access rights data.

20. The computer-readable medium of claim 16, wherein said act of returning a physical address associated with the second-level matching entry includes comparing a set of access rights data in the entry with a desired access right associated with the computer program and generating an exception if the desired access right does not appear in the set of access rights data.

21. The computer-readable medium of claim 16, wherein said act of returning a physical address associated with the second-level matching entry includes copying the second-level matching entry into the first-level translation lookaside buffer.

22. The computer-readable medium of claim 21, wherein a purge of the first-level translation lookaside buffer is not performed before copying the second-level matching entry into the first-level translation lookaside buffer.

* * * * *